Patented Nov. 12, 1935

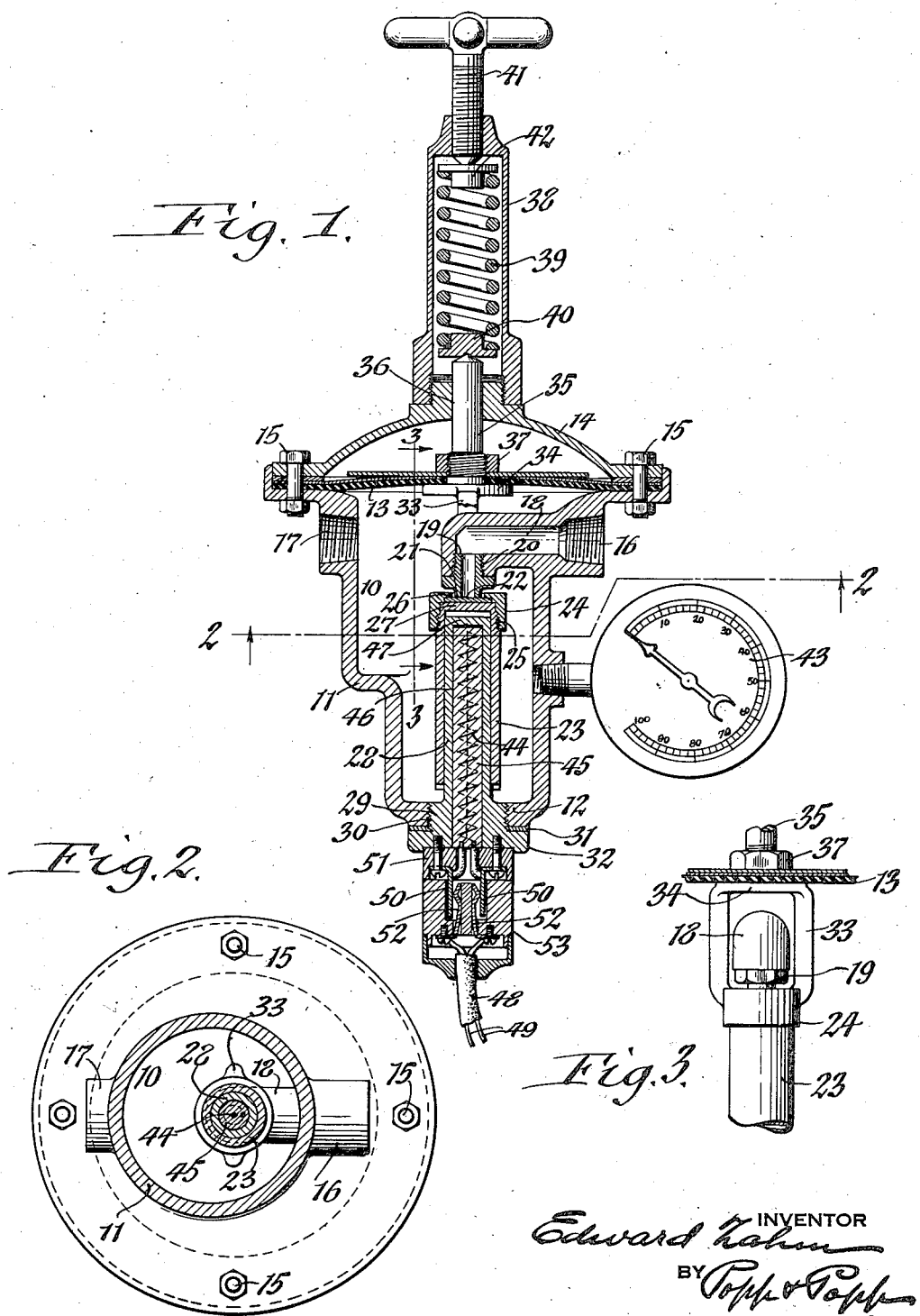

2,020,492

UNITED STATES PATENT OFFICE 2,020,492

GAS PRESSURE REGULATOR

Edward Zahm, Buffalo, N. Y., assignor to Zahm & Nagel Co. Inc., Buffalo, N. Y., a corporation of New York Application May 24, 1934, Serial No. 727,336

1 Claim. (Cl. 50—23)

This invention relates to a pressure regulator whereby gas which is supplied under a relatively high pressure is reduced and delivered to the place of consumption at a low pressure, such a regulator being employed for example in an apparatus for dispensing beer under gas pressure.

In the gas regulators as heretofore constructed for this purpose, it has been found that the expansion of the gas upon reducing the pressure will produce a frosting or icing effect at the point of transition from high to low pressure, and this is liable to cause the valve closure to become frozen in a shut position and thereby render the regulator inoperative until the same has been thawed out by the application of heat.

It is one of the objects of this invention to provide a pressure regulator which embodies a heating element which is so disposed that the valve means which control the passage of gas from the high pressure inlet of the regulator toward the high pressure outlet thereof will be heated and thus prevent the closure from becoming frosted or iced and thereby avoid the possibility of the valve closure being frozen in a shut position.

Another object of this invention is to provide heating means for this purpose which are so organized that the same are of simple construction and built into the interior of the regulator so that no parts of the same are exposed on the exterior thereof, whereby interference with the operation of the regulator is prevented and liability of the same getting out of order is eliminated.

A further object of this invention is to provide simple means for heating the closure of the regulator by an electric element, the current of which may be supplied thereto by means which may be readily connected with and disconnected from the heating element when required.

In the accompanying drawing:—

Figure 1 is a vertical longitudinal section of a pressure regulator of this character embodying the preferred form of my invention.

Figure 2 is a horizontal transverse section, taken on line 2—2 Fig. 1.

Figure 3 is a fragmentary vertical longitudinal section, taken on the correspondingly numbered line in Fig. 1.

In the following description similar characters of reference indicate like parts in the several figures of the drawing:—

Referring to the drawing, the numeral 10 represents the pressure chamber of the regulator which in the present case is formed within a rigid body 11 preferably made of cast metal, and having a lower closed end 12 and the top wall thereof being formed by a flexible diaphragm 13 which extends over the upper end of the body 11 and has its marginal part secured to the upper edge portion of the body by means of an upwardly dished cover 14 bearing at its outer edge against the top of the diahragm wall, and a plurality of bolts 15 passing through the marginal parts of the cover, diaphragm and body 11 for the purpose of detachably connecting the same.

On one side of the upper part of the body 11 the same is provided with an inlet 16 for receiving gas which is supplied under high pressure to the pressure chamber, and on the opposite side the body is provided with an outlet 17 through which the gas is discharged from the pressure chamber by suitable piping to the place of consumption.

Within the upper part of the pressure chamber and below the diaphragm is arranged a conduit 18 which communicates at its outer end with the inlet 16 and forms an inward extension of the latter, and at its inner end this conduit is provided with a nozzle 19 which has its axis arranged concentrically with the diaphragm and is detachably connected with the underside of the conduit 18 by means of a screw joint 20.

At its lower end this nozzle is provided with a valve seat 21 which is preferably flat and faces downwardly or away from the diaphragm 13.

Within the pressure chamber and below the nozzle is arranged a closure means whereby the inlet of the pressure chamber may be opened and closed. This closure includes a packing disk 22 adapted to be moved vertically or axially toward and from the valve seat 21 and is preferably made of leather or other suitable material which will permit of making a tight joint with the valve seat. This valve disk is mounted on the upper end of a guide sleeve 23 of tubular form which is movable lengthwise in the lower part of the pressure chamber.

Although various means may be employed for securing the valve disk 22 to the upper end of the guide sleeve 23, this is preferably accomplished by means of a clamping collar 24 which is connected by means of a screw joint 25 with the upper end of the sleeve 23 and provided with an inwardly projecting flange 26 which overhangs the marginal part of the valve disk and operates to hold the latter against the upper closed end 27 of the sleeve 23, as clearly shown in Fig. 1.

The guide sleeve which carries the valve disk is guided in its longitudinal movement by sliding on an upright or longitudinal guide post 28 which is mounted at its lower end on the bottom of the pressure chamber. In the preferred construction this guide post is provided at its lower end with a plug 29 which is secured by means of a screw joint 30 in an opening in the bottom of the pressure chamber, and a gas-tight joint is formed between these members by means of a gasket 31 which is clamped between the underside of the pressure chamber and an annular flange 32 at the lower end of the screw plug 29.

Motion may be transmitted from the diaphragm to the valve closure by various means, but this is preferably accomplished in the present case by means of a yoke 33 which straddles the inner part of the conduit 18 and has the lower ends of its branches connected with opposite sides of the collar 24 while the upper ends of these branches are connected with a disk 34 bearing against the underside of the central part of the diaphragm. This yoke is connected with the diaphragm and also guided on the cover 14 above the latter by means of a guide stem 35 projecting upwardly from the disk 34 through the diaphragm, and having its upper part guided in a guide opening 36 in the central part of the cover 14, and a clamping nut 37 arranged on the lower part of this stem and engaging with the upper side of the diaphragm.

Means are provided for yieldingly pressing the diaphragm downwardly and tending to move the valve disk away from its seat so as to place the interior of the pressure chamber in communication with the inlet 16. These yielding means may be variously constructed but those shown in the drawing preferably comprise a supporting casing 38 of tubular form secured at its lower end to the central part of the cover 14 around the stem 35, a tension spring 39 arranged in the casing 38 and bearing with its lower end against the upper end of the stem 35 through the medium of a bearing disk 40, and an adjusting screw 41 having a threaded connection with the upper end of the casing 38 and bearing with its inner or lower end against the upper end of the tension screw 39 through the medium of a bearing disk 42.

During the ordinary operation of this valve the valve disk 22 of the closure is held in engagement with the valve seat 21 when the pressure of the gas within the pressure chamber is normal, at which time the predetermined pressure of the gas within this chamber operates to elevate or press outwardly the diaphragm 13 in opposition to the resistance of the tension spring 39, thereby preventing the further in-flow of high pressure gas into the pressure chamber but the outflow of low pressure gas from this chamber through the outlet is possible. When, however, the pressure of the gas within the pressure chamber drops below normal, then the expansion of the spring 39 which at this time preponderates over the gas pressure within the chamber, operates to press the diaphragm downwardly or inwardly, thereby causing the valve disk 22 to be moved away from its seat and thereby permit high pressure gas to enter the chamber through the inlet 16 and the passage formed in the conduit 18 and nozzle 19. The flow of high pressure gas into the chamber continues until the pressure within the chamber has been again raised to the predetermined normal pressure which is desired, and when this has been reached the diaphragm has been raised and the spring 39 has been compressed the requisite extent to cause the valve disk 22 to be again forced against its seat 21 so that the further entrance of high pressure gas into the chamber is cut off. By this means the pressure under which the gas is supplied from the outlet of the chamber may be constantly maintained at a predetermined normal pressure regardless of the higher pressure of the gas which is supplied to the chamber through the inlet thereof.

The pressure of the gas in the chamber 10 is indicated by a gage 43 which preferably communicates with the lower part of the chamber, and by turning the screw 41 in one direction or the other for varying the tension of the spring 39, it is possible to set the regulator so that the closure for the inlet of the pressure chamber will be automatically opened and closed in response to a predetermined fall and rise of the pressure in this chamber.

It has been found in practice that a refrigerating action occurs which causes a deposit of frost or ice upon the cooperating surfaces of the valve seat and the valve closure due to the expansion of the gas as it passes from the gas inlet into the pressure chamber, which frosting action will cause the valve closure to become frozen and stuck in its closed position and therefore necessitates thawing out the mechanism before normal operations can be resumed.

In order to avoid the formation of frost or ice in the manner described, heating means are provided which operate to keep the valve closure sufficiently warm. The preferred means for accomplishing this purpose in accordance with the present invention includes an electric heating element 44, which together with an insulating core 45 is placed within a pocket 46 which is produced in the guide post 28 by making the latter of tubular form. This post is closed at its upper end by means of a head 47 but is open at its lower end for the introduction of the heating element and its insulation.

Current may be conducted to this heating element by various means, but preferably by a cable 48 containing conducting lines or wires 49 which are connected at one end with a source of electric energy while the opposite ends of these lines are detachably connected with the electric heating element in the guide post. The detachable connection between the electric supply lines and the heating element may be effected by means of any suitable coupling, such as the forms now in common use, that shown in the drawing consisting of two fixed terminals 50 mounted on an insulating block 51 at the lower end of the screw plug 29 and connecting with opposite ends of the heating element, and two movable terminals 52 mounted on an insulating head 53 which is connected with the cable 48, said movable terminals forming extensions of the conducting lines 49 and adapted to be engaged with and disengaged from the fixed terminals 50 in a well-known manner.

The electric current passing through the heating element operates to heat the guide post and from the latter the heat is transmitted to the guide sleeve 23, collar 24, and to the valve disk 22 and also to the valve seat 21, thereby keeping these several parts warm and preventing the same from freezing, whereby the valve closure is prevented from becoming stuck.

This heating mechanism is very simple and compact in construction so that it does not increase the size of the regulator as a whole, and as the same is arranged within the enclosing wall of the regulator the same is fully protected and not liable to be injured or rendered inoperative.

I claim as my invention:—

A gas pressure regulator comprising a pressure chamber which has a movable wall forming a diaphragm and which has a gas inlet opening downwardly in the central part thereof and terminating in a valve seat, and also has a gas outlet, a hollow post arranged in the pressure chamber and having a lower plug which is secured by a screw joint in an opening in the lower end of said chamber, a guide sleeve slidable vertically on said post and operatively connected with said diaphragm, a valve disk arranged on the upper end of said sleeve and adapted to be moved toward and from said valve seat, a cap having a screw connection with said sleeve and engaging with the upper side of said valve disk, an insulating block detachably secured to the outer end of said plug and having electric terminals, an insulating core removably arranged in said guide sleeve and connected with said block, and an electrical heating element embedded in said core and having its ends connected respectively with said terminals.

EDWARD ZAHM.